United States Patent
Onozawa (10) Patent No.: US 12,305,708 B2
(45) Date of Patent: May 20, 2025

(54) RETAINER

(71) Applicant: NSK Ltd., Tokyo (JP)

(72) Inventor: Takatsune Onozawa, Kanagawa (JP)

(73) Assignee: NSK LTD., Tokyo (JP)

(*) Notice: Subject to any disclaimer, the term of this patent is extended or adjusted under 35 U.S.C. 154(b) by 0 days.

(21) Appl. No.: 18/274,926

(22) PCT Filed: Dec. 6, 2022

(86) PCT No.: PCT/JP2022/044840
§ 371 (c)(1),
(2) Date: Jul. 28, 2023

(87) PCT Pub. No.: WO2023/157429
PCT Pub. Date: Aug. 24, 2023

(65) Prior Publication Data
US 2025/0020167 A1    Jan. 16, 2025

(30) Foreign Application Priority Data

Feb. 17, 2022 (JP) ................. 2022-022628

(51) Int. Cl.
*F16C 33/41* (2006.01)
*F16C 33/38* (2006.01)

(52) U.S. Cl.
CPC ........ *F16C 33/418* (2013.01); *F16C 33/3887* (2013.01)

(58) Field of Classification Search
CPC .... F16C 33/3887; F16C 33/41; F16C 33/412; F16C 33/414; F16C 33/416; F16C 33/418
See application file for complete search history.

(56) References Cited

U.S. PATENT DOCUMENTS

| | | | | |
|---|---|---|---|---|
| 4,493,513 A | * | 1/1985 | Osawa | F16C 33/418 384/523 |
| 2013/0163909 A1 | * | 6/2013 | Sakaguchi | F16C 33/418 384/523 |

(Continued)

FOREIGN PATENT DOCUMENTS

| | | |
|---|---|---|
| JP | 58-195118 U | 12/1983 |
| JP | 2003-194065 A | 7/2003 |

(Continued)

OTHER PUBLICATIONS

International Search Report for PCT/JP2022/044840 dated Feb. 7, 2023 [PCT/ISA/210].

(Continued)

*Primary Examiner* — Alan B Waits
(74) *Attorney, Agent, or Firm* — Sughrue Mion, PLLC (57) ABSTRACT

A retainer that suppresses retainer sound, includes a main body portion, a plurality of pockets provided in a circumferential direction, and penetrates through the main body portion in a radial direction, and a retaining surface that faces a ball, and forms a C shape when viewed from the radial direction. The retaining surface includes a C-shaped outer circumferential corner portion, a C-shaped inner circumferential corner portion, a first retaining surface arranged in a first rotational direction with respect to the ball, and a second retaining surface arranged in a second rotational direction with respect to the ball. The first retaining surface extends along a first spherical surface obtained by rotating a first virtual circle around a virtual line passing through an axial center and a center of the ball. The second retaining surface extends along a second spherical surface obtained by rotating a second virtual circle around the virtual line.

4 Claims, 9 Drawing Sheets

(56) References Cited

U.S. PATENT DOCUMENTS

2021/0018043 A1* 1/2021 An .................. F16C 19/16
2021/0062867 A1 3/2021 Nanasawa

FOREIGN PATENT DOCUMENTS

| JP | 2003-214437 A | 7/2003 |
| JP | 2004-084768 A | 3/2004 |
| JP | 2012-072815 A | 4/2012 |
| JP | 2016-070422 A | 5/2016 |
| JP | 2021-017981 A | 2/2021 |
| WO | 2019/151456 A1 | 8/2019 |
| WO | 2023/157428 A1 | 8/2023 |
| WO | 2023/157429 A1 | 8/2023 |

OTHER PUBLICATIONS

International Search Report for PCT/JP2022/044831 dated, Feb. 28, 2023 (PCT/ISA/210).

* cited by examiner

RETAINER

CROSS REFERENCE TO RELATED APPLICATIONS

This application is a National Stage of International Application No. PCT/JP2022/044840 filed Dec. 6, 2022, claiming priority based on Japanese Patent Application No. 2022-022628 filed Feb. 17, 2022.

FIELD

The present disclosure relates to a retainer.

BACKGROUND

A bearing device includes a retainer to keep an interval between balls constant. As an example of the retainer, there is a crown-shaped retainer described in the following patent literature. The crown-shaped retainer includes a circular-shaped main body portion extending in a circumferential direction, and a plurality of pockets provided in the main body portion in the circumferential direction. A surface surrounding the pockets (hereinafter, will be referred to as a retaining surface) forms a C shape when viewed in a radial direction, and retains a ball in such a manner that the ball does not get out from the pocket.

CITATION LIST

Patent Literature

Patent Literature 1: JP 2021-17981 A

SUMMARY

Technical Problem

While the bearing device is operating, the retainer vibrates in the radial direction. Then, contact sound between the retaining surface and the ball (hereinafter, will be referred to as a retainer sound) is sometimes produced. Accordingly, the development of a retainer that can suppress the production of the retainer sound is demanded.

The present disclosure has been devised in view of the foregoing, and aims to provide a retainer that can suppress the production of retainer sound.

Solution to Problem

To achieve the above object, a retainer according to a first embodiment of the present disclosure comprising: a main body portion that is arranged between an inner race and an outer race of a bearing device, and forms a circular shape around an axial center of the inner race; a plurality of pockets that is provided in a circumferential direction, and penetrates through the main body portion in a radial direction; and a retaining surface that faces a ball arranged in the pocket, and forms a C shape when viewed from the radial direction, wherein the retaining surface includes a C-shaped outer circumferential corner portion at which the retaining surface and an outer circumferential surface of the main body portion intersect with each other, a C-shaped inner circumferential corner portion at which the retaining surface and an inner circumferential surface of the main body portion intersect with each other, a first retaining surface arranged in a first rotational direction around the axial center, with respect to the ball, and a second retaining surface arranged in a second rotational direction being an opposite direction to the first rotational direction, with respect to the ball, wherein the first retaining surface extends along a first spherical surface obtained by rotating a first virtual circle around a virtual line passing through the axial center and a center of the ball, wherein the second retaining surface extends along a second spherical surface obtained by rotating a second virtual circle around the virtual line, wherein the first virtual circle and the second virtual circle are true circles, wherein radii of the first virtual circle and the second virtual circle are larger than a radius of the ball, and wherein a center of the first virtual circle and a center of the second virtual circle are arranged at positions closer to a radial direction inner side than a virtual plane that has the virtual line as a perpendicular, and includes the center of the ball.

According to the present disclosure, the radii of the first retaining surface (first virtual circle) and the second retaining surface (second virtual circle) are larger than the radius of the ball. That is, curvature radii of the first retaining surface and the second retaining surface become larger, and the first retaining surface and the second retaining surface become gentler curved surfaces than the ball. Thus, clearance amounts between the first retaining surface and the second retaining surface, and the ball become larger as getting closer to the outer side in the radial direction from a central portion in the radial direction. In addition, because the centers of the first retaining surface (first virtual circle) and the second retaining surface (second virtual circle) are arranged at positions closer to the radial direction inner side than the center of the ball (virtual plane), the inner circumferential corner portion becomes larger than the outer circumferential corner portion. Consequently, a clearance amount between the inner circumferential corner portion and the ball becomes larges, and it becomes easier for lubricant oil to flow into the pocket. Accordingly, a large amount of lubricant oil is interposed between the ball and the retaining surface. Thus, even if the retainer vibrates, contact between the ball and the retaining surface is suppressed, and retainer sound is less likely to be produced.

Further, to achieve the above object, a retainer according to a second embodiment of the present disclosure comprising: a main body portion that is arranged between an inner race and an outer race of a bearing device, and forms a circular shape around an axial center of the inner race; a plurality of pockets that is provided in a circumferential direction, and penetrates through the main body portion in a radial direction; and a retaining surface that faces a ball arranged in the pocket, and forms a C shape when viewed from the radial direction, wherein the retaining surface includes a C-shaped outer circumferential corner portion at which the retaining surface and an outer circumferential surface of the main body portion intersect with each other, a C-shaped inner circumferential corner portion at which the retaining surface and an inner circumferential surface of the main body portion intersect with each other, a first retaining surface arranged in a first rotational direction around the axial center, with respect to the ball, and a second retaining surface arranged in a second rotational direction being an opposite direction to the first rotational direction, with respect to the ball, wherein the first retaining surface extends along a first spherical surface obtained by rotating a first virtual circle around a virtual line passing through the axial center and a center of the ball, wherein the second retaining surface extends along a second spherical surface obtained by rotating a second virtual circle around the virtual line, wherein the first virtual circle and the second virtual circle are ellipses, and wherein a center of the first virtual circle and a center of the second virtual circle are arranged at positions closer to a radial direction inner side than a virtual plane that has the virtual line as a perpendicular, and includes the center of the ball.

According to the present disclosure, because the centers of the first retaining surface (first virtual circle) and the second retaining surface (second virtual circle) are arranged at positions closer to the radial direction inner side than the center of the ball (virtual plane), the inner circumferential corner portion becomes larger than the outer circumferential corner portion. Consequently, a clearance amount between the inner circumferential corner portion and the ball becomes larges, and it becomes easier for lubricant oil to flow into the pocket. Accordingly, a large amount of lubricant oil is interposed between the ball and the retaining surface. Thus, even if the retainer vibrates, contact between the ball and the retaining surface is suppressed, and retainer sound is less likely to be produced.

Further, as a preferable embodiment of the retainer, the outer circumferential corner portion is arranged at a position closer to a radial direction outer side than an outer circumferential contact point with which the ball is in the contact, in a case where the ball relatively moves toward the radial direction outer side, and the inner circumferential corner portion is arranged at a position closer to a radial direction inner side than an inner circumferential contact point with which the ball is in contact, in a case where the ball relatively moves toward the radial direction inner side.

According to the above-described configuration, it is possible to avoid a situation where the inner circumferential corner portion and the outer circumferential corner portion contact the ball, and lubricant oil adhering to the ball is scraped off, and vibration is consequently produced. In addition, contact (point contact) between the ball, and the inner circumferential corner portion and the outer circumferential corner portion is avoided, and surface contact therebetween is made. Accordingly, rolling motion of the ball is stabilized.

Further, as a preferable embodiment of the retainer, the center of the first virtual circle is arranged at a position closer to the second retaining surface than the virtual line, and the center of the second virtual circle is arranged at a position closer to the first retaining surface than the virtual line.

According to the above-described configuration, as compared with a case where the center of the first virtual circle and the center of the second virtual circle are arranged on the virtual line, curvature radii of the first retaining surface and the second retaining surface become larger. In other words, clearance amounts between the first retaining surface and the second retaining surface, and the ball can be made larger as getting closer to the radial direction outer side or inner side from the central portion in the radial direction. Accordingly, a dimension of the inner circumferential corner portion becomes larger, and it becomes easier for lubricant oil to flow into the pocket.

Further, as a preferable embodiment of the retainer, the center of the first virtual circle and the center of the second virtual circle coincide with each other on the virtual line.

Advantageous Effects of Invention

According to the retainer of the present disclosure, the production of retainer sound is suppressed.

DESCRIPTION OF EMBODIMENTS

A mode for carrying out the invention will be described in detail with reference to the drawings. The present disclosure is not limited by the content described in the following description. In addition, the components described below include components that can be easily conceived by the one skilled in the art, and substantially equivalent components. Furthermore, the components described below can be appropriately combined.

First Embodiment

Figure 1:
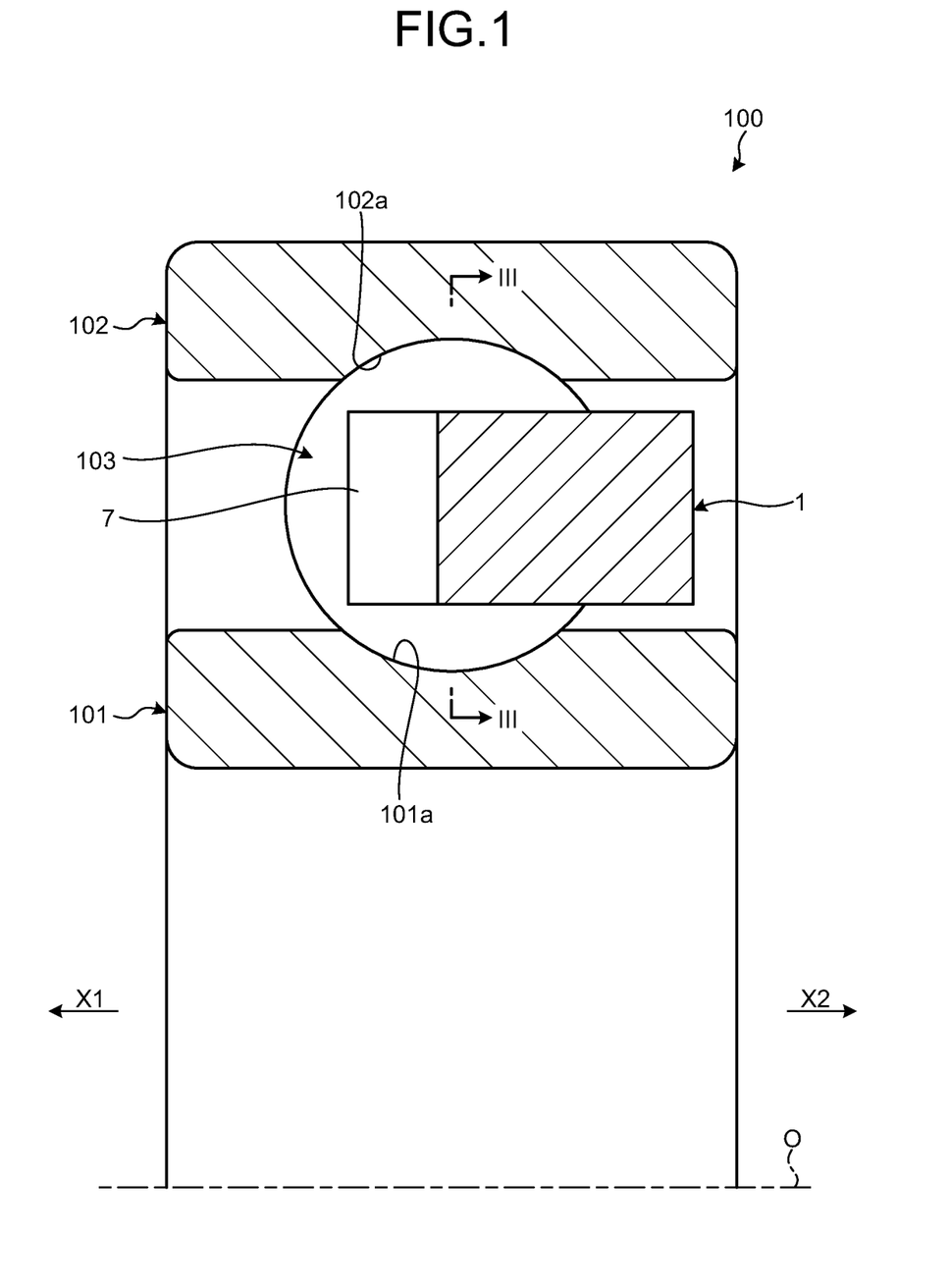
FIG. 1 is a cross-sectional view of a bearing device of a first embodiment that is cut along an axial center.
Figure 2:
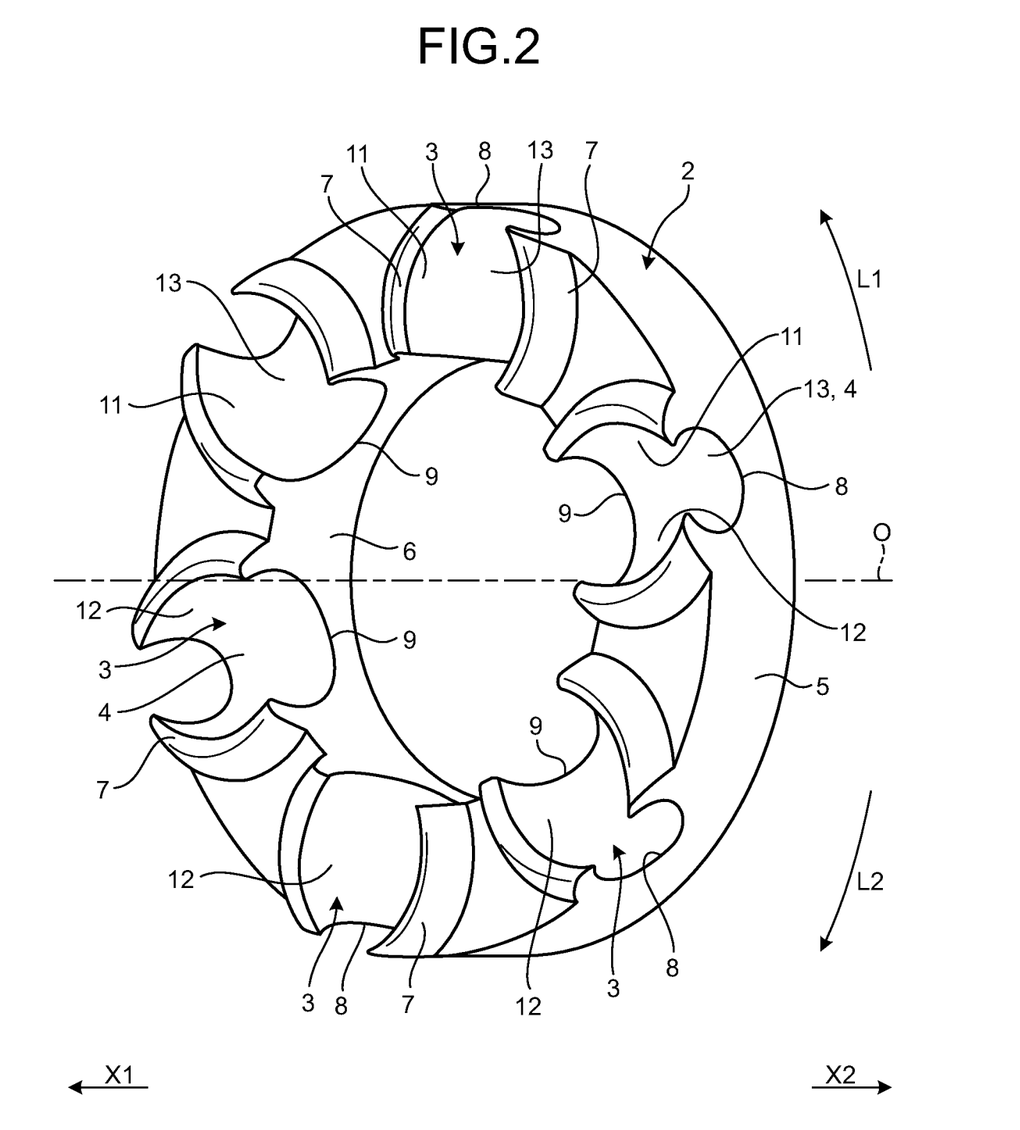
FIG. 2 is a perspective view obliquely illustrating the retainer of the first embodiment.
Figure 3:
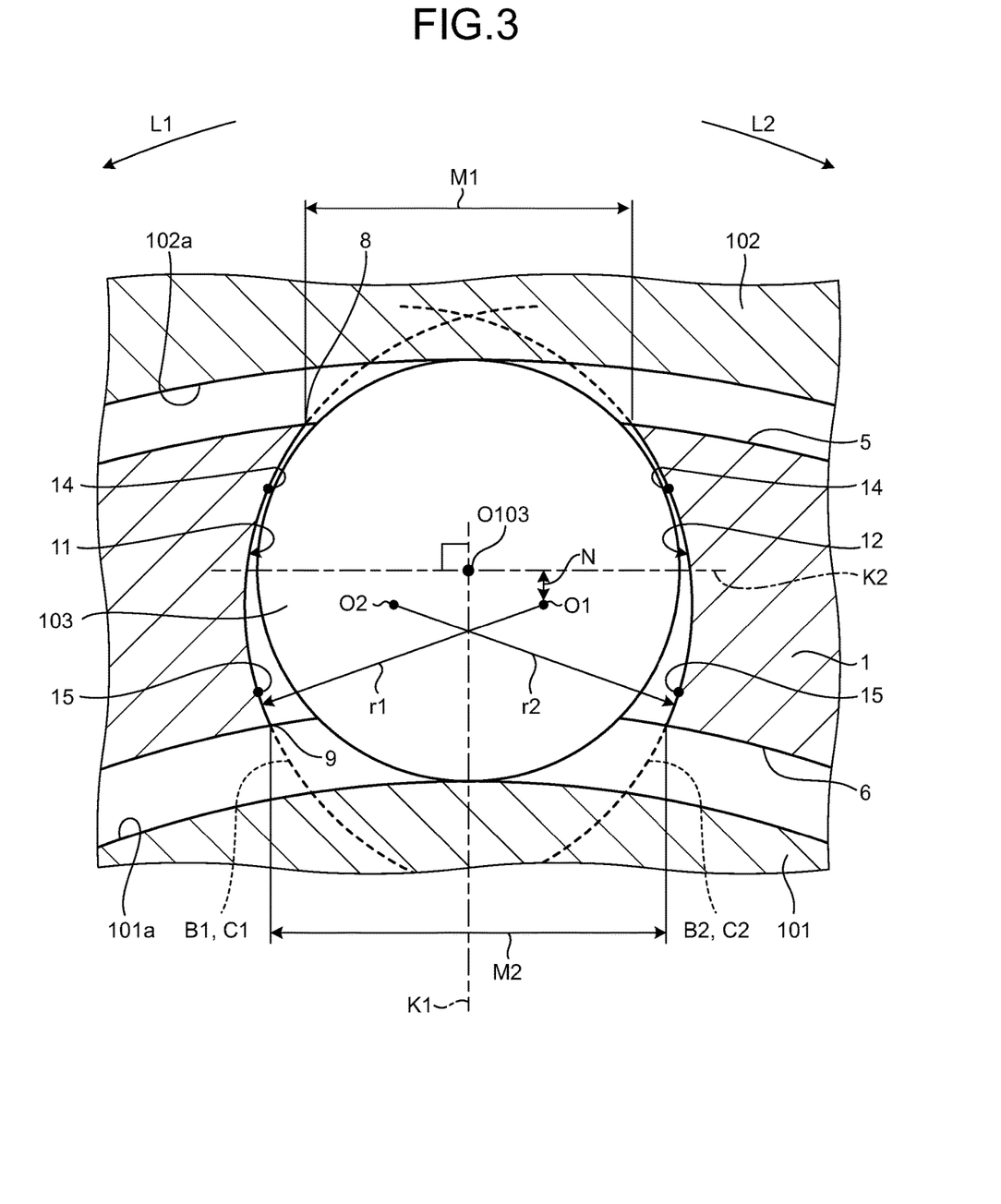
FIG. 3 is an arrow cross-sectional view taken along a III-III line in FIG. 1.
Figure 4:
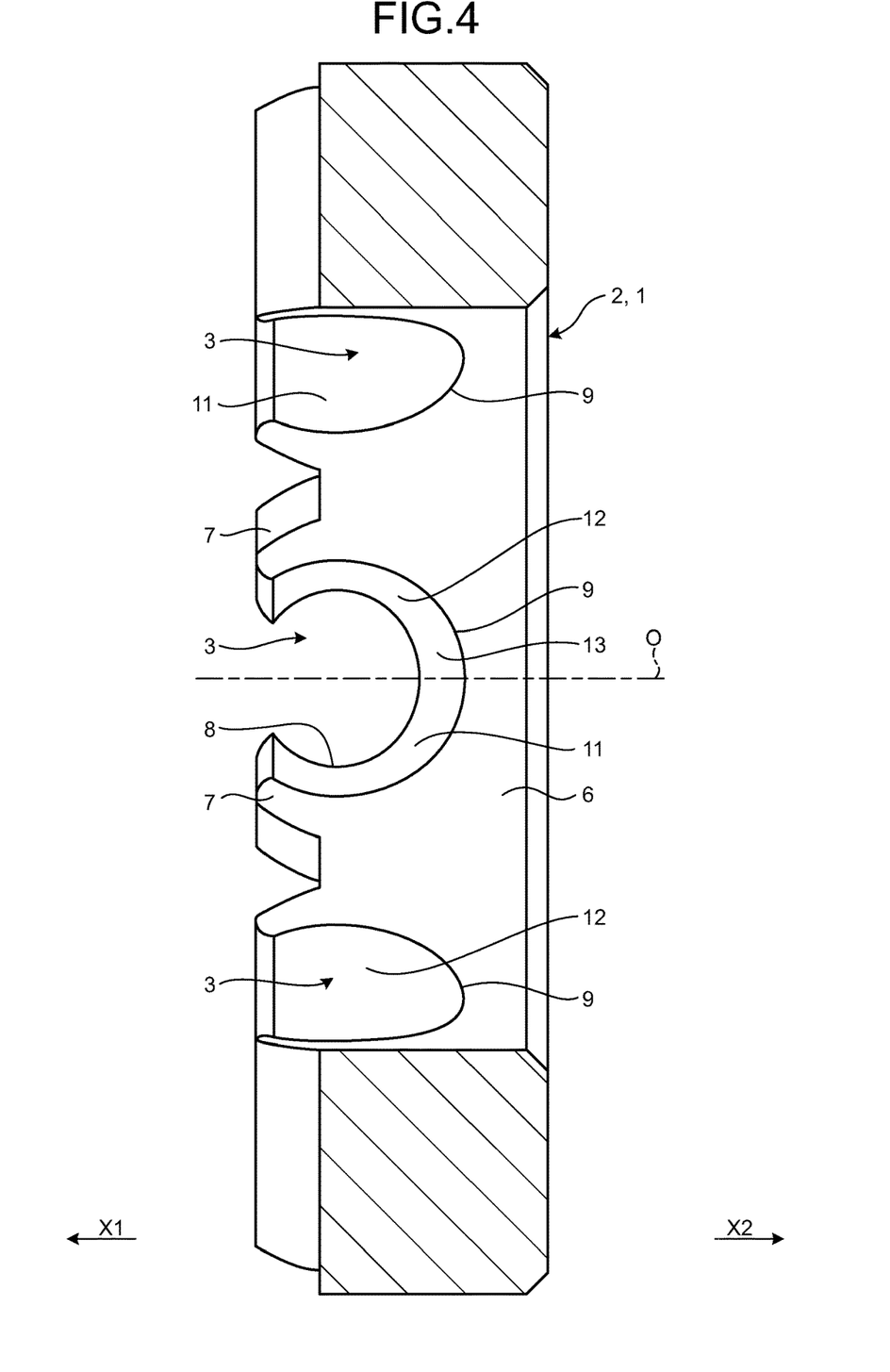
FIG. 4 is a view illustrating the retainer of the first embodiment that is viewed from an outer circumferential side.

FIG. 1 is a cross-sectional view of a bearing device of the first embodiment that is cut along an axial center. FIG. 2 is a perspective view obliquely illustrating the retainer of the first embodiment. FIG. 3 is an arrow cross-sectional view taken along a III-III line in FIG. 1. FIG. 4 is a view illustrating the retainer of the first embodiment that is viewed from an outer circumferential side.

As illustrated in FIG. 1, a bearing device 100 includes an inner race 101 forming a circular shape around an axial center O, an outer race 102 surrounding the outer circumferential side of the inner race 101, and a plurality of balls 103 and a retainer 1 that are arranged between the inner race 101 and the outer race 102. On the outer circumferential surface of the inner race 101, an outer circumferential track surface 101*a* is provided. On the inner circumferential surface of the outer race 102, an inner circumferential track surface 102*a* is provided. The balls 103 are arranged between the outer circumferential track surface 101*a* and the inner circumferential track surface 102*a*. Note that examples of materials forming the inner race 101 and the outer race 102 include bearing steel and stainless material, but the inner race 101 and the outer race 102 in the present disclosure may be formed of materials other than these. In addition, materials forming the balls 103 include bearing steel, stainless material, and ceramic material, but the balls 103 in the present disclosure may be formed of materials other than these.

As illustrated in FIG. 2, the retainer 1 forms a circular shape around the axial center O. The retainer 1 includes a circular-shaped main body portion 2 centered on the axial center O, a plurality of pockets (spaces) 3 in which the balls 103 are arranged, and retaining surfaces 4 surrounding the pockets 3. Hereinafter, a direction parallel to the axial center O will be referred to as an axial direction.

The main body portion 2 includes an outer circumferential surface 5 oriented toward a radial direction outer side, and an inner circumferential surface 6 oriented toward a radial direction inner side. In addition, a pair of tab portions 7 and 7 are provided in the main body portion 2. The tab portions 7 are provided for expanding the retaining surface 4 in the axial direction.

Hereinafter, out of axial directions, a direction in which the pair of tab portions 7 and 7 protrude from the main body portion 2 will be referred to as a first direction X1, and an opposite direction to the first direction will be referred to as a second direction. In addition, regarding rotational directions around the axial center O, a counterclockwise direction set when the retainer is viewed from a first axial direction will be referred to as a first rotational direction L1, and an opposite direction will be referred to as a second rotational direction.

The pockets 3 penetrates through the main body portion 2 in the radial direction. Accordingly, on the outer circumferential surface 5 of the main body portion 2, openings in the first direction X1 of the pockets 3 are provided. In addition, at a rim portion of the opening in the first direction X1 of the pocket 3, an outer circumferential corner portion 8 at which the retaining surface 4 and the outer circumferential surface 5 intersect with each other is provided. On the other hand, on the inner circumferential surface 6 of the main body portion 2, openings in a second direction X2 of the pockets 3 are provided. At a rim portion of the opening in the second direction X2 of the pocket 3, an inner circumferential corner portion 9 at which the retaining surface 4 and the inner circumferential surface 6 intersect with each other is provided. When viewed from the radial direction, the outer circumferential corner portion 8 and the inner circumferential corner portion 9 form a C shape opening in the first direction X1.

The retaining surface 4 includes a first retaining surface 11 arranged in the first rotational direction L1 with respect to the pocket 3, a second retaining surface 12 arranged in the second rotational direction with respect to the pocket 3, and a central retaining surface 13 arranged in the second direction X2 with respect to the pocket 3. Hereinafter, the details of the first retaining surface 11 and the second retaining surface 12 will be described.

As illustrated in FIG. 3, the first retaining surface 11 extends along a first spherical surface B1. The second retaining surface 12 extends along a second spherical surface B2. The first spherical surface B1 is a surface obtained by rotating a first virtual circle C1 being a true circle centered on a center O1, around a virtual line K1 connecting the axial center O (refer to FIGS. 1 and 2) and a center O103 of the ball 103. In addition, the second spherical surface B2 is a surface obtained by rotating a second virtual circle C2 being a true circle centered on a center O2, around the virtual line K1. Accordingly, the first retaining surface 11 and the second retaining surface 12 have a hemispherical surface shape.

The center O1 of the first virtual circle C1 and the center O2 of the second virtual circle C2 exist in a range overlapping the ball 103. The center O1 of the first virtual circle C1 is arranged at a position closer to the second retaining surface 12 than the virtual line K1. That is, a radius r1 of the first virtual circle C1 is larger than a radius of the ball 103. Accordingly, the first retaining surface 11 is a gentler curved surface as compared with the ball 103. Then, a clearance amount between the first retaining surface 11 and the ball 103 becomes larger as getting closer to the radial direction outer side (the outer circumferential corner portion 8) and the radial direction inner side (the inner circumferential corner portion 9) from a central portion in the radial direction.

Note that a virtual plane K2 illustrated in FIG. 3 is a plane that has the virtual line K1 as a perpendicular, and includes the center O103 of the ball 103. Accordingly, the center O103 of the ball 103 serves as a foot of the perpendicular (the virtual line K1) of the virtual plane K2.

In addition, the center O1 of the first virtual circle C1 is arranged at a position closer to the radial direction inner side than the virtual plane K2, and closer to the inner circumferential corner portion 9 than to the outer circumferential corner portion 8. Thus, a clearance amount between the first retaining surface 11 and the ball 103 on the radial direction inner side (the inner circumferential corner portion 9) is larger than that on the radial direction outer side (the outer circumferential corner portion 8).

Similarly, the center O2 of the second virtual circle C2 is arranged at a position closer to the first retaining surface 11 than the virtual line K1. Accordingly, a radius r2 of the second virtual circle C2 is larger than the radius of the ball 103. Accordingly, the second retaining surface 12 is a gentler curved surface as compared with the ball 103. Then, a clearance amount between the second retaining surface 12 and the ball 103 becomes larger as getting closer to the radial direction outer side (the outer circumferential corner portion 8) and the radial direction inner side (the inner circumferential corner portion 9) from a central portion in the radial direction. Note that the radius r1 of the first virtual circle C1 and the radius r2 of the second virtual circle C2 are the same.

In addition, the center O2 of the second virtual circle C2 is arranged at a position closer to the radial direction inner side than the virtual plane K2, and closer to the inner circumferential corner portion 9 than to the outer circumferential corner portion 8. Thus, a clearance amount between the second retaining surface 12 and the ball 103 on the radial direction inner side (the inner circumferential corner portion 9) is larger than that on the radial direction outer side (the outer circumferential corner portion 8). Note that a distance between the center O2 of the second virtual circle C2 and the virtual plane K2 is the same as a distance N (refer to FIG. 3) between the center O1 of the first virtual circle C1 and the virtual plane K2.

In view of the foregoing, in the present embodiment, a dimension M2 of the inner circumferential corner portion 9 is larger than a dimension M1 of the outer circumferential corner portion 8. Accordingly, as illustrated in FIG. 4, when the pocket 3 is viewed from the inner circumferential side of the retainer 1, the outer circumferential corner portion 8 arranged on the inner side of the inner circumferential corner portion 9 can be visually recognized. On the other hand, when the pocket 3 is viewed from the outer circumferential side of the retainer 1, the inner circumferential corner portion 9 overlaps the outer circumferential surface 5 of the main body portion 2 and cannot be visually recognized, which is not specifically illustrated.

In addition, as illustrated in FIG. 3, the dimension M1 of the outer circumferential corner portion 8 and the dimension M2 of the inner circumferential corner portion 9 are smaller than a diameter of the ball 103. Accordingly, the ball 103 is less likely pass through the outer circumferential corner portion 8 and the inner circumferential corner portion 9 to get out.

In addition, the first retaining surface 11 and the second retaining surface 12 each include an outer circumferential side contact point 14 that contacts the ball 103 in a case where the retainer 1 moves toward the radial direction inner side, and an inner circumferential side contact point 15 that contacts the ball 103 in a case where the retainer 1 moves toward the radial direction outer side. The outer circumferential corner portion 8 is separated from the outer circumferential side contact point 14 toward the radial direction outer side. In addition, the inner circumferential corner portion 9 is separated from the inner circumferential side contact point 15 toward the radial direction inner side. Accordingly, the situation where the outer circumferential corner portion 8 and the inner circumferential corner portion 9 contact the ball 103, and grease adhering to the ball 103 is scraped off is not caused. In addition, the ball 103 makes surface contact with the first retaining surface 11 and the second retaining surface 12 without contacting (without making point contact with) the outer circumferential corner portion 8 nor the inner circumferential corner portion 9, and rolling motion of the ball 103 is stabilized.

Next, an effect of the retainer of the first embodiment will be described. According to the above-described bearing device 100, the inner circumferential corner portion 9 is opened widely. Thus, lubricant oil provided on the outer circumferential track surface 101a easily passes through a space between the inner circumferential corner portion 9 and the ball 103, and flows into the pocket 3. Accordingly, a large amount of lubricant oil is interposed between the ball 103 and the retaining surface 4. Thus, if the retainer 1 vibrates in the radial direction, contact between the ball 103 and the retaining surface 4 is suppressed by the lubricant oil provided between the ball 103 and the retaining surface 4. Accordingly, retainer sound is less likely to be produced.

As described above, the retainer 1 of the first embodiment includes the main body portion 2 that is arranged between the inner race 101 and the outer race 102 of the bearing device 100, and forms a circular shape around the axial center O of the inner race 101, the plurality of pockets 3 that is provided in the circumferential direction, and penetrates through the main body portion 2 in the radial direction, and the retaining surface 4 that faces the ball 103 arranged in the pocket 3, and forms a C shape when viewed from the radial direction. The retaining surface 4 includes the C-shaped outer circumferential corner portion 8 at which the retaining surface 4 and the outer circumferential surface 5 of the main body portion 2 intersect with each other, the C-shaped inner circumferential corner portion 9 at which the retaining surface 4 and the inner circumferential surface 6 of the main body portion 2 intersect with each other, the first retaining surface 11 arranged in the first rotational direction L1 around the axial center O, with respect to the ball 103, and the second retaining surface 12 arranged in a second rotational direction L2 being an opposite direction to the first rotational direction L1, with respect to the ball 103. The first retaining surface 11 extends along the first spherical surface B1 obtained by rotating the first virtual circle C1 around the virtual line K1 passing through the axial center O and the center O103 of the ball 103. The second retaining surface 12 extends along the second spherical surface B2 obtained by rotating the second virtual circle C2 around the virtual line K1. The radii of the first virtual circle C1 and the second virtual circle C2 are larger than the radius of the ball 103. The center O1 of the first virtual circle C1 and the center O2 of the second virtual circle C2 are arranged at positions closer to the radial direction inner side than the virtual plane K2 that has the virtual line K1 as a perpendicular, and includes the center O103 of the ball 103.

According to the retainer 1 of the first embodiment, a large amount of lubricant oil is interposed between the ball 103 and the retaining surface 4, contact between the ball 103 and the retaining surface 4 is suppressed, and retainer sound is less likely to be produced.

In addition, the outer circumferential corner portion 8 of the first embodiment is arranged at a position closer to the radial direction outer side than the outer circumferential side contact point 14 with which the ball is in contact, in a case where the ball 103 relatively moves toward the radial direction outer side. The inner circumferential corner portion 9 is arranged at a position closer to the radial direction inner side than the inner circumferential side contact point 15 with which the ball is in contact, in a case where the ball 103 relatively moves toward the radial direction inner side.

According to the above-described configuration, the situation where grease adhering to the ball 103 is scraped off from the outer circumferential corner portion 8 and the inner circumferential corner portion 9 is not caused. In addition, the ball 103 makes surface contact with the first retaining surface 11 and the second retaining surface 12, and rolling motion of the ball 103 is stabilized.

In addition, in the first embodiment, the center O1 of the first virtual circle C1 is arranged at a position closer to the second retaining surface 12 than the virtual line K1. In addition, the center O2 of the second virtual circle C2 is arranged at a position closer to the first retaining surface 11 than the virtual line K1.

According to the above-described configuration, as compared with a case where the center O1 of the first virtual circle C1 and the center O2 of the second virtual circle C2 are arranged on the virtual line K1, curvature radii of the first retaining surface 11 and the second retaining surface 12 become larger. Accordingly, clearance amounts between the first retaining surface 11 and the second retaining surface 12, and the ball 103 become larger as getting closer to the radial direction outer side or inner side from the central portion in the radial direction. Consequently, the dimension of the inner circumferential corner portion 9 becomes larger.

Second Embodiment

Figure 5:
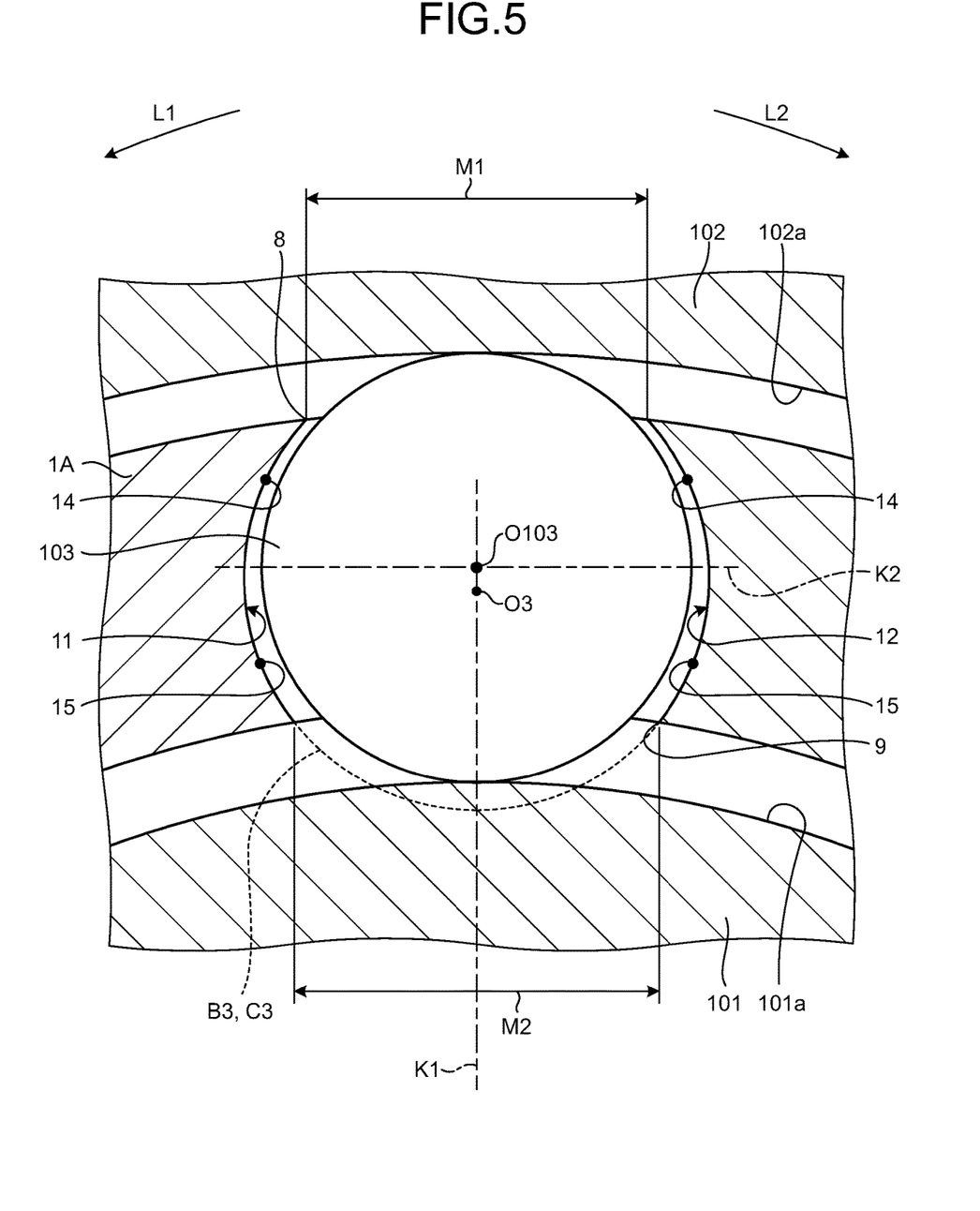
FIG. 5 is a cross-sectional view of a retainer of a second embodiment.

Next, a retainer 1A of the second embodiment will be described. The retainer 1A of the second embodiment differs from that in the first embodiment in that a center O1 of a first virtual circle C1 and a center O2 of a second virtual circle C2 coincide with each other. That is, in the second embodiment, as illustrated in FIG. 5, a first retaining surface 11 and a second retaining surface 12 extend along a single spherical surface B3. Hereinafter, only a difference will be described.

The spherical surface B3 is obtained by rotating a virtual circle C3 around a virtual line K1. A center O3 of the spherical surface B3 is arranged on the virtual line K1. In addition, the center O3 of the virtual circle C3 is arranged at a position closer to the radial direction inner side than a virtual plane K2.

Also in the retainer 1A of the second embodiment, a dimension M2 of an inner circumferential corner portion 9 is larger than a dimension M1 of an outer circumferential corner portion 8. Accordingly, lubricant oil easily passes through a space between the inner circumferential corner portion 9 and a ball 103, and flows into a pocket 3. Thus, a large amount of lubricant oil is interposed between the ball 103 and a retaining surface 4. Accordingly, production of retainer sound can be suppressed.

Third Embodiment

Figure 6:
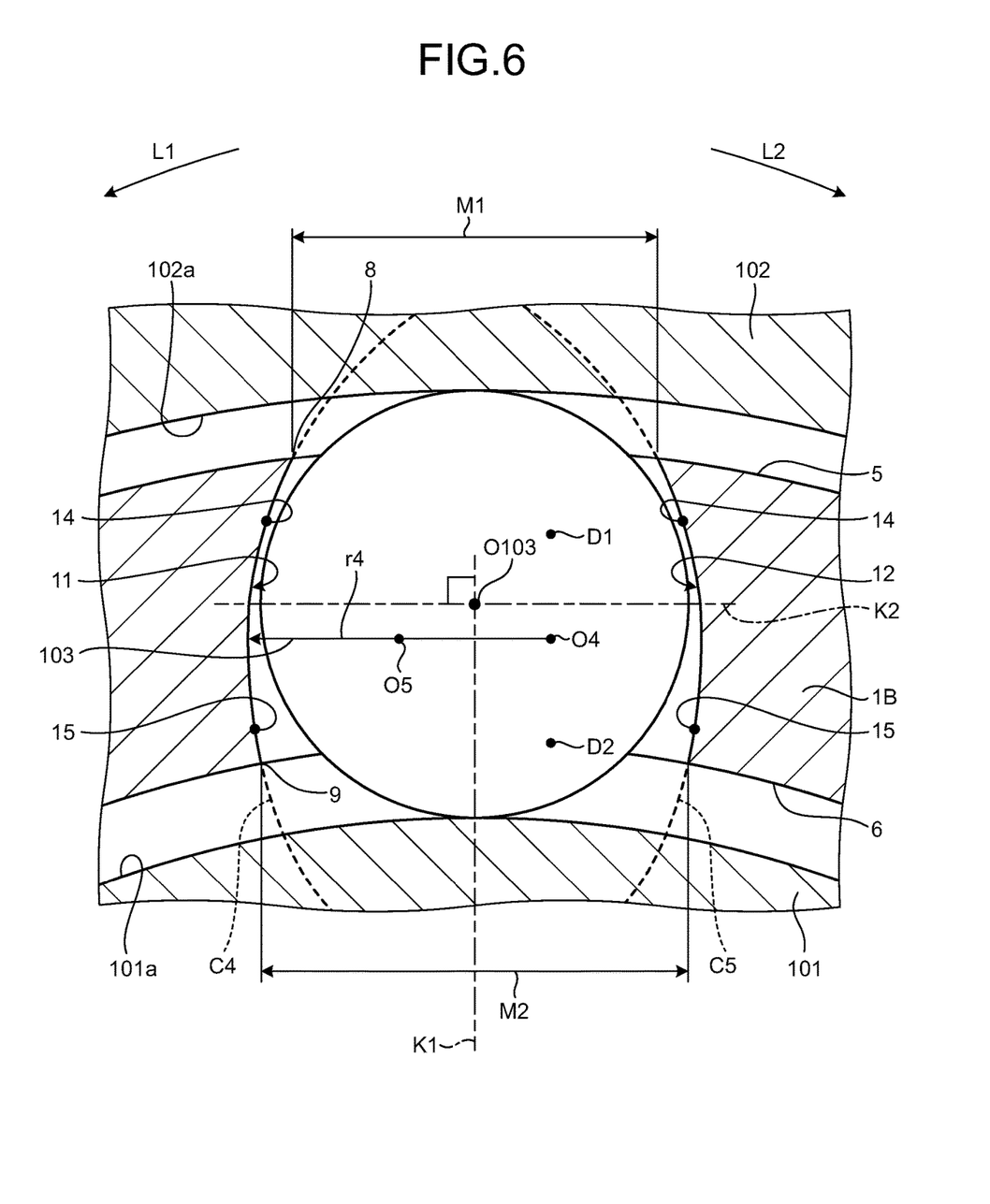
FIG. 6 is a cross-sectional view of a retainer of a third embodiment.

Next, a retainer 1B of the third embodiment will be described. FIG. 6 is a cross-sectional view of a retainer of the third embodiment. The retainer 1B of the third embodiment differs from that in the first embodiment in that a first virtual circle C4 and a second virtual circle C5 are not true circles but ellipses. Note that the first virtual circle C4 and the second virtual circle C5 are line symmetric with respect to a virtual line K1. Accordingly, the first virtual circle C4 will be described, and the description of the second virtual circle C5 will be omitted.

As illustrated in FIG. 6, the ellipse (the first virtual circle C4) is a curved line generated from an aggregate of points of which a sum of distances from two foci D1 and D2 becomes constant. A center O4 of the ellipse (the first virtual circle C4) is an intermediate point of the two foci D1 and D2. The foci D1 and D2 are arranged on the virtual line K1. Accordingly, a major axis of the ellipse (the first virtual circle C4) extends in a direction parallel to the virtual line K1, and a minor axis of the ellipse (the first virtual circle C4) extends in a direction orthogonal to the virtual line K1.

A radius of the ellipse (the first virtual circle C4) becomes shortest at a point overlapping the minor axis. A length (radius) r4 of the minor axis of the ellipse (the first virtual circle C4) is larger than a radius of a ball 103. Accordingly, the first retaining surface 11 is a gentler curved surface as compared with the ball 103. In addition, a clearance amount between the first retaining surface 11 and the ball 103 becomes larger as getting closer to the radial direction outer side (an outer circumferential corner portion 8) and the radial direction inner side (an inner circumferential corner portion 9) from a central portion in the radial direction.

The center O4 of the ellipse (the first virtual circle C4) is arranged at a position closer to the radial direction outer side than a virtual plane K2, and closer to the outer circumferential corner portion 8 than to the inner circumferential corner portion 9. Thus, a clearance amount between the first retaining surface 11 and the ball 103 on the radial direction outer side (the outer circumferential corner portion 8) is larger than that on the radial direction inner side (the inner circumferential corner portion 9). That is, in the third embodiment, a dimension M1 of the outer circumferential corner portion 8 is larger than a dimension M2 of the inner circumferential corner portion 9. Accordingly, also in the retainer 1B of the third embodiment, similarly to the first embodiment, contact between the ball 103 and the retaining surface 4 is suppressed, and retainer sound is less likely to be produced.

Note that, in the third embodiment, major axes of the first virtual circle C4 and the second virtual circle C5 extend in a direction parallel to the virtual line K1, but in the present disclosure, major axes of the first virtual circle C4 and the second virtual circle C5 may extend in a direction orthogonal to the virtual line K1.

Heretofore, each embodiment has been described, but the present disclosure is not limited to the example described in the embodiment. For example, in the first embodiment, the center O1 of the first virtual circle C1 and the center O2 of the second virtual circle C2 have the same distance to the virtual plane K2, but the present disclosure is not limited to this. For example, the center O1 of the first virtual circle C1 and the center O2 of the second virtual circle C2 may have different distances to the virtual plane K2.

Note that, according to the present disclosure, as a distance between a center of a virtual circle and the virtual plane K2 becomes larger, the inner circumferential corner portion 9 becomes larger. On the other hand, if the dimension M2 of the inner circumferential corner portion 9 is larger than the diameter of the ball 103, the ball 103 gets out from the pocket 3. Accordingly, a distance between a center of a virtual circle and the virtual plane K2 needs to be shorter than a limit distance between a center of a virtual circle and the virtual plane K2 (distance obtained in a case where the dimension M2 of the inner circumferential corner portion 9 becomes the same as the diameter of the ball 103).

Figure 7:
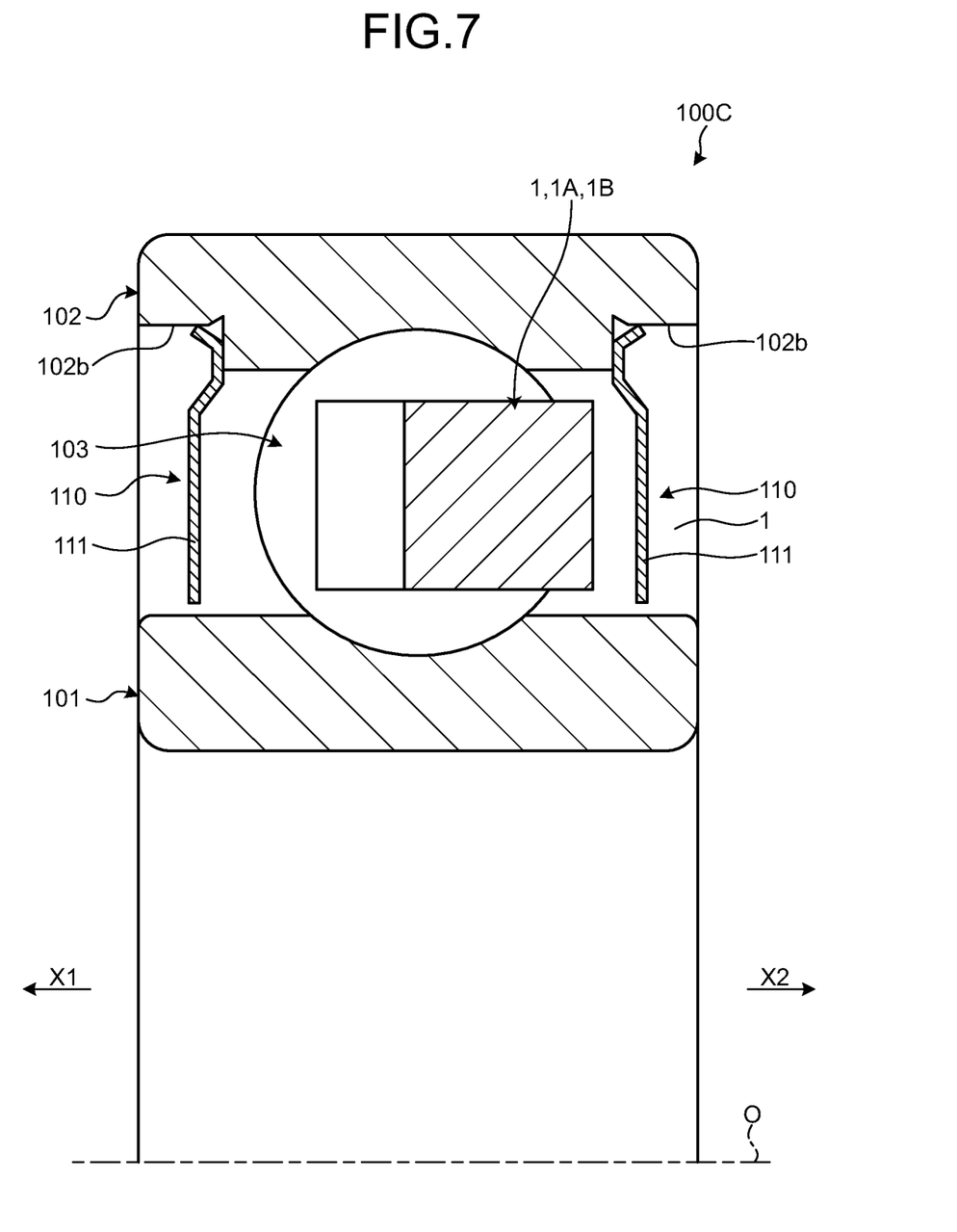
FIG. 7 is a cross-sectional view of a bearing device of Modified Example 1 that is cut along an axial center.

FIG. 7 is a cross-sectional view of a bearing device of Modified Example 1 that is cut along an axial center. In addition, bearing devices to which the retainers 1, 1A, and 1B of the present disclosure are applied are not limited to the bearing device 100 illustrated in FIG. 1. For example, as illustrated in FIG. 7, a bearing device 100C may include two seal materials 110 aside from an inner race 101, an outer race 102, a ball 103, and the retainer 1, 1A, or 1B. The seal material 110 includes a core bar 111 that fits with a stepped surface 102b of the outer race 102. In addition, the two seal materials 110 are arranged in a first direction X1 and a second direction X2 with respect to the ball 103. According to the two seal materials 110, a foreign substance is less likely to enter a space between the inner race 101 and the outer race 102. Note that the seal material 110 in the present disclosure may be a seal material 110 in which a rubber portion slidably contacting the inner race 101 is provided at an end portion on the radial direction inner side of the core bar 111.

Figure 8:
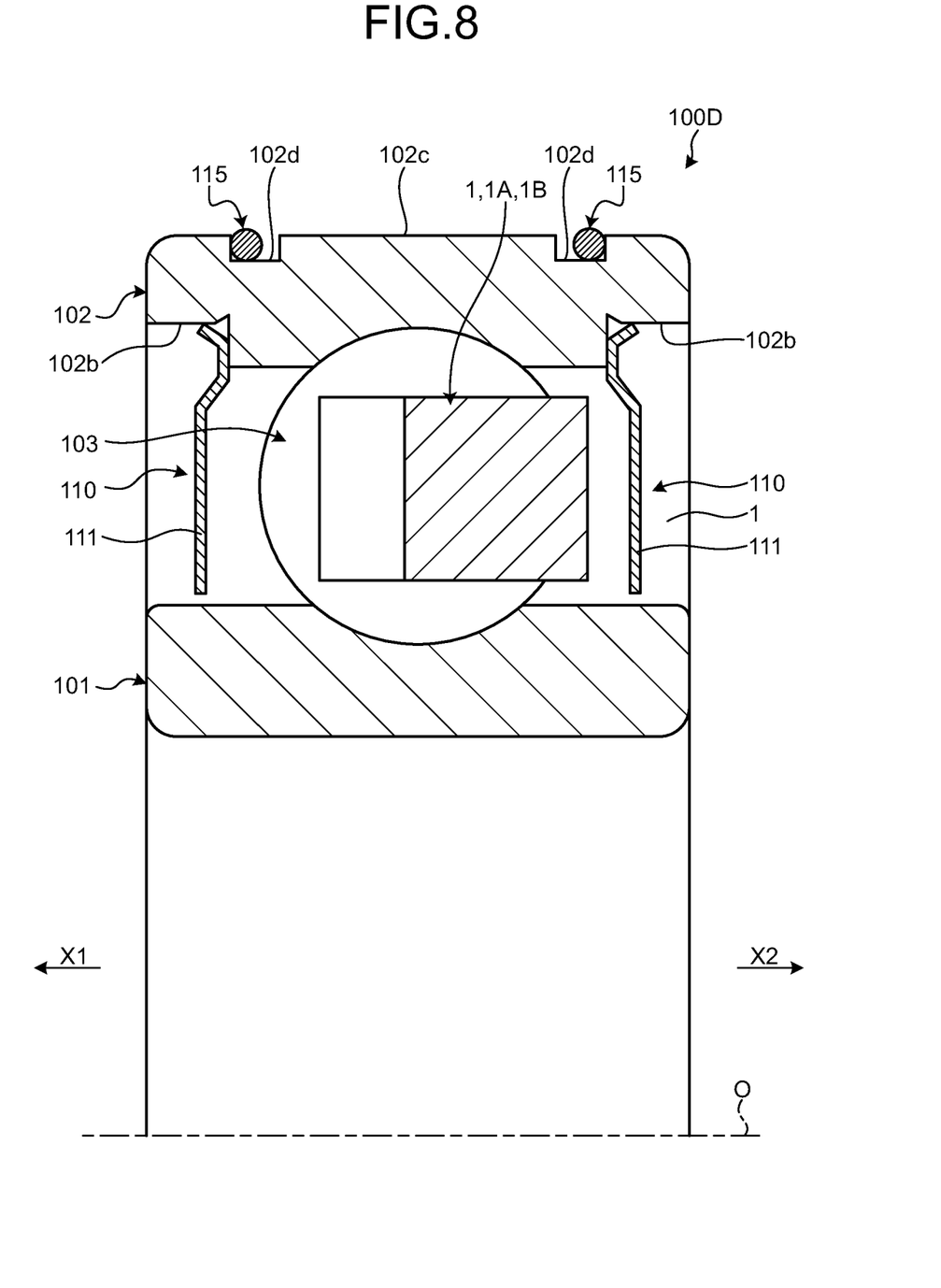
FIG. 8 is a cross-sectional view of a bearing device of Modified Example 2 that is cut along an axial center.

FIG. 8 is a cross-sectional view of a bearing device of Modified Example 2 that is cut along an axial center. In addition, as illustrated in FIG. 8, in a bearing device 100D of Modified Example 2, a circumferential groove 102d extending in the circumferential direction is provided on an outer circumferential surface 102c of an outer race 102. Then, an O ring 115 is fitted into the circumferential groove 102d. According to the O ring 115, a space between a surface with which the outer race 102 fits, and the outer circumferential surface of the outer race 102 is sealed. The retainers 1, 1A, and 1B of the present disclosure may be applied to the bearing device 100D. A cross-sectional shape of the O ring 115 is not limited to a circular shape as illustrated in FIG. 8, and may be a rectangular shape. In addition, an O ring 115 in which a groove is formed may be used. In addition, the retainers 1, 1A, and 1B of the present disclosure may be applied to a bearing device in which a retaining ring or the like is fitted into the circumferential groove 102d in place of the O ring 115. In this manner, bearing devices to which the retainers 1, 1A, and 1B of the present disclosure are applied are not specifically limited.

Example

Next, Example will be described. As Example, the retainer 1 of the first embodiment was manufactured. Then, Example was tested, and whether the production of retainer sound is suppressed was checked. In addition, Comparative Example was prepared to confirm the effect of the retainer 1. As a first retaining surface 11 and a second retaining surface 12 of a retainer of Comparative Example, a first retaining surface 11 and a second retaining surface 12 extending along a single virtual circle, the center of which overlaps the center of a ball, were used.

As a test method, a bearing including a retainer of Example and a bearing including a retainer of Comparative Example were prepared, and cooled under a stationary condition for one hour in the environment of 0° C. After that, outer races of the respective bearings were fixed, inner races were rotated using motors, and images of behaviors of the retainers were captured using a high-speed camera. Note that the number of revolutions of the motors was set to 11,500 $\text{min}^{-1}$. In addition, as load acting on the bearings, axial load was 4 N and radial load was 0 N. Then, a frequency of sound produced from each bearing was analyzed based on captured image data. Note that, as relationship between frequency and retainer sound, if the number of times the retainer 1 and the ball 103 contact is large, high-pitched retainer sound (sound with high frequency) is produced. That is, a result indicating a lower frequency indicates a preferable result indicating that the number of times the retainer 1 and the ball 103 contact is suppressed to a small number, and retainer sound is suppressed to small sound.

Figure 9:
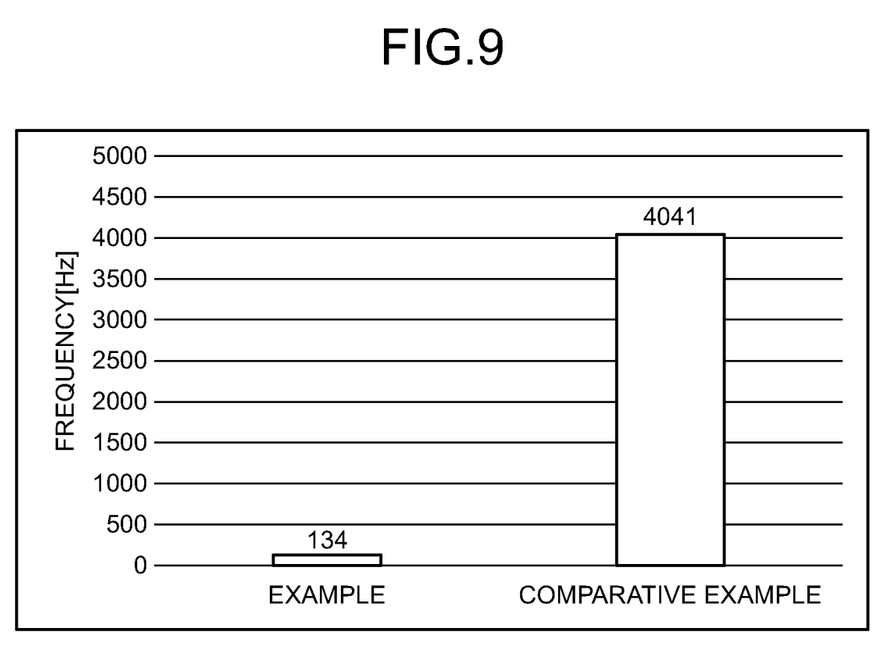
FIG. 9 is a diagram illustrating test results of bearings including retainers of Example and Comparative Example.

FIG. 9 is a diagram illustrating test results of bearings including retainers of Example and Comparative Example. As illustrated in FIG. 9, a frequency of sound produced from the retainer of Example was 134 Hz, and a frequency of sound produced from the retainer of Comparative Example was 4041 Hz. In view of the foregoing, it has been seen that, according to Example, the production of retainer sound is drastically suppressed. In this manner, according to Example, lubrication in the pocket 3 is improved. Thus, excited vibration of the retainer 1 is drastically suppressed, and the production of retainer sound is eventually suppressed.

REFERENCE SIGNS LIST 100, 100C, 100D BEARING DEVICE
101 INNER RACE
102 OUTER RACE
103 BALL
1, 1A, 1B Retainer
2 MAIN BODY PORTION
3 POCKET
4 RETAINING SURFACE
5 OUTER CIRCUMFERENTIAL SURFACE
6 INNER CIRCUMFERENTIAL SURFACE
7 TAB PORTION
8 OUTER CIRCUMFERENTIAL CORNER PORTION
9 INNER CIRCUMFERENTIAL CORNER PORTION
11 FIRST RETAINING SURFACE
12 SECOND RETAINING SURFACE
14 OUTER CIRCUMFERENTIAL SIDE CONTACT POINT
15 INNER CIRCUMFERENTIAL SIDE CONTACT POINT
B1 FIRST SPHERICAL SURFACE
B2 SECOND SPHERICAL SURFACE
B3 SPHERICAL SURFACE
C1 FIRST VIRTUAL CIRCLE
C2 SECOND VIRTUAL CIRCLE
C3 VIRTUAL CIRCLE
C4 FIRST VIRTUAL CIRCLE
C5 SECOND VIRTUAL CIRCLE
K1 VIRTUAL LINE
K2 VIRTUAL PLANE

The invention claimed is:

1. A retainer bearing device comprising an inner race, an outer race, a ball, and a retainer, the retainer including:
a main body portion that is arranged between the inner race and the outer race, and forms a circular shape around a rotational center of the inner race;
a plurality of pockets that are provided in a circumferential direction, and penetrate through the main body portion in a radial direction; and
a retaining surface that faces the ball arranged in the pocket, and forms a C shape when viewed from the radial direction,
wherein the retaining surface includes
a C-shaped outer circumferential corner portion at which the retaining surface and an outer circumferential surface of the main body portion intersect with each other,
a C-shaped inner circumferential corner portion at which the retaining surface and an inner circumferential surface of the main body portion intersect with each other,
a first retaining surface arranged in a first rotational direction around the rotational center, with respect to the ball, and
a second retaining surface arranged in a second rotational direction being an opposite direction to the first rotational direction, with respect to the ball,
wherein the first retaining surface extends along a first spherical surface obtained by rotating a first virtual circle around a virtual line passing through the rotational center and a center of the ball,
wherein the second retaining surface extends along a second spherical surface obtained by rotating a second virtual circle around the virtual line,
wherein the first virtual circle and the second virtual circle are true circles,
wherein radii of the first virtual circle and the second virtual circle are larger than a radius of the ball,
wherein a center of the first virtual circle and a center of the second virtual circle are arranged at positions closer to a radial direction inner side than a virtual plane that has the virtual line as a perpendicular, and includes the center of the ball,
wherein the outer circumferential corner portion is arranged at a position closer to a radial direction outer side than an outer circumferential contact point with which the ball is in contact, in a case where the ball relatively moves toward the radial direction outer side, and
wherein the inner circumferential corner portion is arranged at a position closer to a radial direction inner side than an inner circumferential contact point with which the ball is in contact, in a case where the ball relatively moves toward the radial direction inner side.

2. A bearing device comprising an inner race, an outer race, a ball, and a retainer, the retainer including:
a main body portion that is arranged between the inner race and the outer race, and forms a circular shape around a rotational center of the inner race;
a plurality of pockets that are provided in a circumferential direction, and penetrate through the main body portion in a radial direction; and
a retaining surface that faces the ball arranged in the pocket, and forms a C shape when viewed from the radial direction,
wherein the retaining surface includes
a C-shaped outer circumferential corner portion at which the retaining surface and an outer circumferential surface of the main body portion intersect with each other,
a C-shaped inner circumferential corner portion at which the retaining surface and an inner circumferential surface of the main body portion intersect with each other,
a first retaining surface arranged in a first rotational direction around the rotational center, with respect to the ball, and
a second retaining surface arranged in a second rotational direction being an opposite direction to the first rotational direction, with respect to the ball,
wherein the first retaining surface extends along a first spherical surface obtained by rotating a first virtual circle around a virtual line passing through the rotational center and a center of the ball, wherein the second retaining surface extends along a second spherical surface obtained by rotating a second virtual circle around the virtual line, wherein the first virtual circle and the second virtual circle are ellipses, wherein a center of the first virtual circle and a center of the second virtual circle are arranged at positions closer to a radial direction inner side than a virtual plane that has the virtual line as a perpendicular, and includes the center of the ball, wherein the outer circumferential corner portion is arranged at a position closer to a radial direction outer side than an outer circumferential contact point with which the ball is in contact, in a case where the ball relatively moves toward the radial direction outer side, and wherein the inner circumferential corner portion is arranged at a position closer to a radial direction inner side than an inner circumferential contact point with which the ball is in contact, in a case where the ball relatively moves toward the radial direction inner side.

3. A bearing device comprising an inner race, an outer race, a ball, and a retainer, the retainer including:

a main body portion that is arranged between the inner race and the outer race, and forms a circular shape around a rotational center of the inner race;

a plurality of pockets that are provided in a circumferential direction, and penetrate through the main body portion in a radial direction; and a retaining surface that faces the ball arranged in the pocket, and forms a C shape when viewed from the radial direction, wherein the retaining surface includes a C-shaped outer circumferential corner portion at which the retaining surface and an outer circumferential surface of the main body portion intersect with each other, a C-shaped inner circumferential corner portion at which the retaining surface and an inner circumferential surface of the main body portion intersect with each other, a first retaining surface arranged in a first rotational direction around the rotational center, with respect to the ball, and a second retaining surface arranged in a second rotational direction being an opposite direction to the first rotational direction, with respect to the ball, wherein the first retaining surface extends along a first spherical surface obtained by rotating a first virtual circle around a virtual line passing through the rotational center and a center of the ball, wherein the second retaining surface extends along a second spherical surface obtained by rotating a second virtual circle around the virtual line, wherein the first virtual circle and the second virtual circle are true circles, wherein radii of the first virtual circle and the second virtual circle are larger than a radius of the ball, wherein a center of the first virtual circle and a center of the second virtual circle are arranged at positions closer to a radial direction inner side than a virtual plane that has the virtual line as a perpendicular, and includes the center of the ball, wherein the center of the first virtual circle is arranged at a position closer to the second retaining surface than the virtual line, and wherein the center of the second virtual circle is arranged at a position closer to the first retaining surface than the virtual line.

4. A bearing device comprising an inner race, an outer race, a ball, and a retainer, the retainer including:

a main body portion that is arranged between the inner race and the outer race, and forms a circular shape around a rotational center of the inner race;

a plurality of pockets that are provided in a circumferential direction, and penetrate through the main body portion in a radial direction; and a retaining surface that faces the ball arranged in the pocket, and forms a C shape when viewed from the radial direction, wherein the retaining surface includes a C-shaped outer circumferential corner portion at which the retaining surface and an outer circumferential surface of the main body portion intersect with each other, a C-shaped inner circumferential corner portion at which the retaining surface and an inner circumferential surface of the main body portion intersect with each other, a first retaining surface arranged in a first rotational direction around the rotational center, with respect to the ball, and a second retaining surface arranged in a second rotational direction being an opposite direction to the first rotational direction, with respect to the ball, wherein the first retaining surface extends along a first spherical surface obtained by rotating a first virtual circle around a virtual line passing through the rotational center and a center of the ball, wherein the second retaining surface extends along a second spherical surface obtained by rotating a second virtual circle around the virtual line, wherein the first virtual circle and the second virtual circle are true circles, wherein radii of the first virtual circle and the second virtual circle are larger than a radius of the ball, wherein a center of the first virtual circle and a center of the second virtual circle are arranged at positions closer to a radial direction inner side than a virtual plane that has the virtual line as a perpendicular, and includes the center of the ball, and wherein the center of the first virtual circle and the center of the second virtual circle coincide with each other on the virtual line.

* * * * *